Sept. 25, 1934.   M. S. MAXIM   1,974,829
PROCESS AND APPARATUS FOR PRODUCTION OF SULPHURIC ANHYDRIDE
Filed June 15, 1931
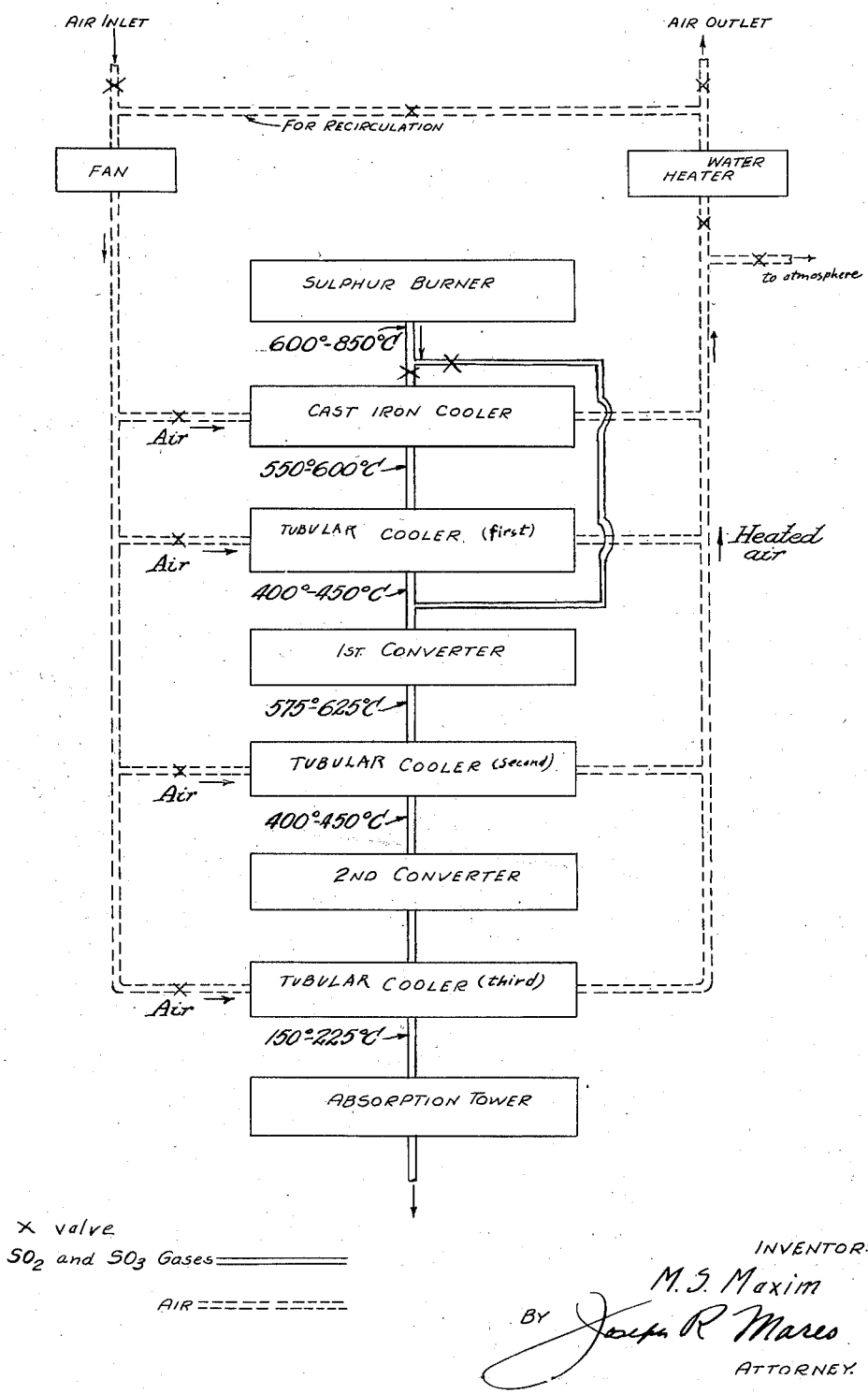
INVENTOR:
M. S. Maxim
BY
ATTORNEY.

Patented Sept. 25, 1934

1,974,829

UNITED STATES PATENT OFFICE 1,974,829

PROCESS AND APPARATUS FOR PRODUCTION OF SULPHURIC ANHYDRIDE

Myles Standish Maxim, Somerville, Mass., assignor to Merrimac Chemical Company, Inc., Everett, Mass., a corporation of Massachusetts Application June 15, 1931, Serial No. 544,441

6 Claims. (Cl. 23—176)

This invention relates to the manufacture of sulphuric anhydride by the catalytic oxidation of sulphur dioxide, and it has particular relation to a process wherein sulphur is burned by means of air, previously dried, whereby a relatively dry sulphur dioxide gas is obtained which after adjustment of its temperature may be converted into sulphuric anhydride.

Heretofore it has been proposed to employ sulphur as a starting material for the manufacture of sulphuric acid and at the same time recover the heat generated as by conducting the sulphur oxide gases through a water tube boiler. Various embodiments of this general idea have been installed and operated. Uniformly, however, difficulties particularly those of a corrosion origin have been encountered which have rendered the system unsatisfactory. Moreover, a failure in the water cooling system necessitates shutting down the plant and may often result in extensive damage to the catalyst as well as to the equipment.

Since the boiling point of sulphuric acid is relatively high as compared to the boiling point of water, cooling by means of water even when maintained at super-atmospheric pressure, such as prevails in the ordinary steam boiler, is attended with danger because of the tendency of sulphur trioxide and water vapor to form mist at the surface of the tubes due to the low surface or skin temperature. I have observed that when hot sulphur dioxide gases are cooled preparatory for their oxidation to sulphuric anhydride, it is not uncommon to have a temperature drop between the sulphur dioxide gases and the heat abstracting surface (skin temperature) of as much as 100° C. I have also observed that air carries sufficient moisture to form a mist of sulphuric acid in the cooling system which sulphuric acid mist deposits upon the metal surfaces, such, for example, as the water tube boiler, resulting in rapid corrosion and deterioration of the equipment. Even when air is dried preliminary to the combustion of sulphur, sufficient moisture remains in the air to produce an injurious quantity of mist upon cooling.

The present invention deals specifically with a process wherein the expensive lead cooling system for sulphur dioxide gases is avoided and the heat of the reactions involved is conserved. The invention contemplates a unit for burning sulphur by means of previously dried and compressed air, whereby one obtains a suitable mixture of sulphur dioxide and oxygen for the production of sulphuric anhydride. The temperature of the resulting gases is adjusted thereafter by means of an air cooling system which includes a boiler for abstracting and recovering the heat from the air.

The invention has as its principal object the provision of a method and apparatus for the manufacture of sulphuric anhydride from brimstone which eliminates the disadvantages of former processes, and which at the same time enables one to recover the surplus heat of the reactions.

A further object of the invention is to provide a means of temperature control for the gases at the several critical stages in the process which is accurate, economical to install, and simple to operate.

The invention likewise contemplates an efficient and safe method of recovering the heat generated in the manufacture of sulphuric anhydride from brimstone. These together with other objects will become more readily apparent from a consideration of the flow sheet and description specifically related thereto.

The accompanying flow sheet illustrates diagrammatically the various elements and their relationship to each other, entering into a combination constituting one form of my invention which may be preferred.

According to the present invention, sulphur is oxidized to sulphur dioxide by any well known method, using air which has previously been dried, as by scrubbing the same with concentrated sulphuric acid and which may previously have been filtered to remove suspended foreign matter before being dried. For this purpose a burner of the design illustrated in my co-pending application S. N. 544,440 may be employed to advantage.

The gases discharged from the sulphur burner are at a temperature of approximately 650°–850° C. and should be cooled to a temperature of approximately 400°–450° C. before they are subjected to catalysis. Preliminary cooling to 550°–600° C. may be effected advantageously in a cast iron cooler, the temperature of which is maintained by circulating air at a regulated rate in contact therewith. Inasmuch as the temperature differential between the air and gases is substantial, rapid and efficient transfer of heat is realized. The cast iron drum may be fitted with baffles to insure circulation of sulphur dioxide gases within the drum as well as fins on the outer surface thereof with which the cool air may contact. Additional heat is abstracted from the gases, preferably in a cooler of steel tubular design wherein the sulphur dioxide gases pass around the tubes preparatory for the first stage of the catalysis.

The first converter which may be of any well known design performs 70 or more percent of the conversion of the sulphur dioxide to sulphuric anhydride. Since the reaction is exothermic, and unless heat is abstracted from the gases undergoing catalysis which may be effected conveniently by means of heat abstracting elements disposed within the converter, the gases will attain a temperature of approximately 600° C. Thereafter the temperature is adjusted in a second tubular cooler of a design similar to the first tubular cooler, preparatory for the second stage of the catalysis wherein the conversion to sulphuric anhydride is raised to 96–98%. The second converter may be of a design similar to the first, or may be of a different design, if desired.

The gases discharged from the second converter are cooled in a third tubular cooler to a temperature of approximately 150°–225° C. Thereafter they are absorbed in the usual manner to produce an acid product of the desired concentration. The cooling is effected by air which may be recirculated through the several coolers in a single cooling system, substantially as illustrated, or the cooling may be effected by two or more independent air systems. The heat abstracted from the gaseous mixture undergoing chemical reaction may be recovered by circulating the same through a water heater or a water boiler whereby a substantial quantity of the heat is removed and the air thus cooled may be returned to the fan and recirculated. If desired, the relatively warm air discharged from the water heater may be admixed with fresh air whereby an air mixture suitable for cooling purposes of any desired temperature is obtained.

Similarly, one may discharge the air from the water heater to the atmosphere and thus circulate the air but at a single time. Provision is made for discharging the hot air in order to heat the surrounding atmosphere as well as to afford opportunity for inspection and repair of the water heater. In this respect, the present invention affords marked advantages over the former types in that operation of the acid manufacturing unit is not interrupted by reason of failure of the water cooling system. It is likewise to be noted that whereas a leak in the conventional water cooling system wherein the sulphur gases are in direct contact with the water heater results in immediate deposition of moisture throughout the sulphur gas system, the effect of which might extend to the destruction of the catalyst as well as corrosion of the equipment, failure of the water cooling system in applicant's design is not fatal and indeed does not require the interruption of operation of the acid manufacturing unit.

In commencing the operation of the unit, it is convenient to burn ordinary gas in the sulphur burner in order to bring the sulphur burning unit to operating temperature. To facilitate the adjustment of temperature, one may by-pass the gases from the sulphur burner directly to the first converter. As soon as the desired burner temperature is attained, the sulphur dioxide gas may be by-passed around the cast iron cooler and the first tubular cooler directly to the first converter. After the temperature of the converter unit beyond the first cooler has thus been established, the by-pass is closed and the gas is circulated through the cast iron cooler and first tubular cooler. The temperature of the entire system is regulated thereafter by valves disposed, for example, as indicated in the flow sheet. Under normal operating conditions, the air is supplied to the cooling units at approximately 25° C. The rate at which air is circulated through the coolers is regulated to attain optimum conversion conditions. A rate whereby the sulphur dioxide containing gases discharge from the cast iron cooler at 550°–600° C., from the first and second tubular coolers at 400°–440° C. and from the third tubular cooler at 200°–225° C. or lower has been found satisfactory when using a vanadium catalyst. If desired the air from the third tubular cooler may be circulated through the cast iron cooler in lieu of the supply of air as provided according to the flow sheet.

Although catalysts of any type may be employed, vanadium catalysts have been found to be particularly well suited.

Notwithstanding the fact that but a single specific embodiment has been illustrated and described, and certain modifications have been suggested, it will be apparent to those skilled in the art that the invention is susceptible to numerable modifications without departing from the spirit thereof.

What I claim is:

1. In a process for manufacturing sulphuric anhydride from a mixture of substantially dry gases containing sulphur dioxide and oxygen at a temperature of 600°–850° C., and in which said gas mixture is subjected to catalytic oxidation under controlled temperature conditions, the steps which include conducting gases through a cast iron heat exchanger wherein said gases are cooled by means of air circulated in heat exchange relation therewith to a temperature of approximately 550°–600° C., conducting said gas mixture into a steel tubular heat exchanger wherein relatively cool air is circulated in heat exchange relation with said gases whereby the temperature of the gases is reduced to 400°–450° C. and thereafter subjecting the gas mixture to catalytic oxidation.

2. In a process for manufacturing sulphuric anhydride from a mixture of substantially dry gases containing sulphur dioxide and oxygen at a temperature of 600°–850° C., and in which said gas mixture is subjected to catalytic oxidation under controlled temperature conditions, the steps which include conducting the gases through a cast iron heat exchanger wherein said gases are cooled by means of air circulated in heat exchange relation therewith to a temperature of approximately 550°–600° C., conducting said gas mixture into a steel tubular heat exchanger wherein relatively cool air is circulated in heat exchange relation with said gases whereby the temperature of the gases is reduced to 400°–450° C., and subsequently subjecting said gases to a two stage catalysis.

3. In an apparatus for manufacturing sulphuric anhydride by the combustion of a dry gaseous sulphur dioxide and air mixture means for producing a substantially dry gaseous mixture, containing sulphur dioxide and oxygen, a cast iron cooler for receiving said gas mixture, adapted to reduce the temperature thereof, a tubular cooler for receiving the gases from the cast iron cooler adapted to reduce the temperature thereof, a catalytic converter for effecting a stage of the catalysis of sulphur dioxide to sulphuric anhydride, a cooler for adjusting the temperature of the catalyzed gases preliminary to a second stage of catalysis, a second converter for completing the catalysis, a tubular cooler for abstracting heat from the catalyzed gases whereby the temperature thereof is reduced, and means for supplying air to the several heat exchange elements at a regulated rate to effect the desired cooling.

4. In an apparatus for manufacturing sulphuric anhydride by the combustion of a dry sulphur dioxide and air gaseous mixture, means for producing a substantially dry gaseous mixture, containing sulphur dioxide and oxygen, a cast iron cooler for receiving said gas mixture, adapted to reduce the temperature thereof, a tubular cooler for receiving the gases from the cast iron cooler adapted to reduce the temperature thereof, a catalytic converter for effecting a stage of the catalysis of sulphur dioxide to sulphuric anhydride, a cooler for adjusting the temperature of the catalyzed gases preliminary to a second stage of catalysis, a second converter for completing the catalysis, a tubular cooler for abstracting heat from the catalyzed gases whereby the temperature thereof is reduced, means for supplying air to the several heat abstracting elements, and a heat exchanger for abstracting heat from the air previously circulated through the heat abstracting elements.

5. An apparatus as defined in claim 3 and further characterized in that means are provided for by-passing the sulphur dioxide gases around the cast iron cooler and first tubular cooler.

6. In an apparatus for manufacturing sulphuric anhydride by the combustion of a dry gaseous sulphur dioxide and air mixture, means for producing a substantially dry gaseous mixture, containing sulphur dioxide and oxygen, a cast iron cooler for receiving said gas mixture, adapted to reduce the temperature thereof, a tubular steel cooler for receiving the gases from the cast iron cooler, adapted to reduce the temperature thereof, a catalytic converter for effecting a stage of catalysis of the sulphur dioxide to sulphuric anhydride, a cooler for adjusting the temperature of the catalyzed gases, a second converter for completing the catalysis, and means for supplying air to the several heat exchange elements at a regulated rate to effect the desired degree of cooling.

MYLES STANDISH MAXIM.